US006558150B1

(12) United States Patent
Karbach

(10) Patent No.: US 6,558,150 B1
(45) Date of Patent: May 6, 2003

(54) ARRANGEMENT FOR MOVING A TURNTABLE IN AN APPARATUS FOR MOLDING AND PUNCHING OUT CONTAINERS FROM THERMOPLASTIC PLASTIC FOIL

(75) Inventor: Helmut Karbach, Heilbronn (DE)

(73) Assignee: Adolf Illig Maschinenbau GmbH & Co. KG, Heilbronn (DE)

( * ) Notice: Subject to any disclaimer, the term of this patent is extended or adjusted under 35 U.S.C. 154(b) by 0 days.

(21) Appl. No.: 09/568,510

(22) Filed: May 11, 2000

(30) Foreign Application Priority Data

May 11, 1999 (DE) .......................................... 199 21 668

(51) Int. Cl.[7] .............................................. B29C 51/22
(52) U.S. Cl. ...................... 425/441; 425/398; 425/403.1
(58) Field of Search .............................. 425/292, 403.1, 425/388, 398, 441, 442, 443, 444

(56) References Cited

U.S. PATENT DOCUMENTS

| 4,170,621 A | * | 10/1979 | Kiefer | .......................... 425/412 |
| 4,565,513 A | * | 1/1986 | Kiefer | .......................... 425/289 |
| 4,890,524 A | * | 1/1990 | Brown | .......................... 83/615 |
| 5,975,877 A | * | 11/1999 | Merklinghaus et al. | 425/403.16 |
| 6,135,756 A | * | 10/2000 | Arends | .......................... 425/398 |

FOREIGN PATENT DOCUMENTS

| CA | 2240428 | 6/1998 |
| DE | 33 46 628 | 3/1986 |
| DE | 197 10475 | 9/1998 |

* cited by examiner

Primary Examiner—Jan H. Silbaugh
Assistant Examiner—Thu Khanh T. Nguyen
(74) Attorney, Agent, or Firm—Venable; Norman N. Kunitz

(57) ABSTRACT

The method of moving a turntable in an apparatus for molding and punching out containers from a thermoplastic plastic foil by a differential pressure is to be executed such that relatively-small gravitational forces occur as the end positions of the pivoting movement are approached. In this way, the apparatus can be operated with a high stroke number, and not necessitate complicated curved paths. This is attained through the reduction of the distance between the center of gravity of the unit comprising the turntable and the lower tool half and a fixed pivot point in the first half of the pivoting angle during the pivoting of the turntable, with the distance being increased again in the second half of the pivoting angle. This change in position supports the accelerating or braking of the turntable.

15 Claims, 5 Drawing Sheets

ARRANGEMENT FOR MOVING A TURNTABLE IN AN APPARATUS FOR MOLDING AND PUNCHING OUT CONTAINERS FROM THERMOPLASTIC PLASTIC FOIL

CROSS REFERENCE TO RELATED APPLICATION

This application claims the priority of German Application No. 199 21 668-1 filed May 11, 1999, which is incorporated herein by reference.

BACKGROUND OF THE INVENTION

The invention relates to a method of moving a turntable in an apparatus for molding and punching out containers of the generic type described in the main claim, and a device for executing the method.

From DE 33 46 628 C2, it is known to configure the molding table of an apparatus for deep-drawing containers from thermoplastic plastic foil as a turntable. This permits the lower molding-tool half to be pivoted, with the molded, punched-out containers, into a discharge position, in which the containers are ejected from the deep-drawing molds, preferably directly into stacking grooves. A vertical downward stroke prior to the pivoting of the turntable into the stacking position is necessary for two reasons. First, a tool edge of the lower tool half would collide with the upper, stationary tool half. Secondly, the punching absolutely must take place in a vertical movement of the two tool halves for the two tools to be guided together.

The vertical movement of the turntable is effected by cam disks, with one cam disk for the upward movement and one cam disk for the downward movement, as well as a toggle lever and a lever rod assembly. The two cam disks must be exactly matched to one another, which entails complex calculations, costly manufacturing and precise assembly. The turntable is pivoted by means of a third cam disk and a bracket mounted to the molding table. The pivot point of the turntable also serves as the point of articulation of the toggle lever, and is seated in a guided bearing. This means that the pivot point, and therefore the bearing units, execute a linear up-and-down movement during a stroke. In terms of energy, the toggle-gear drive must exert corresponding work during each stroke, and this work must be cancelled out during the downward movement. This process generates accelerating and braking forces, which act on the components and impact their wear behavior.

Another problem associated with pivoting is accelerating and braking the turntable. Particularly in FIG. 3 of DE 33 46 628 C2, the drive for the pivoting movement and the components that must absorb the forces of the moved masses are visible. An objective is to position the pivot point of the turntable in the center of gravity of the unit comprising the turntable and the lower tool half. This is not always the case, however, because the molding tool is exchangeable, and has a different embodiment depending on the shape and the number of containers to be produced per batch. Its weight also varies, which influences the position of the center of gravity. Yet, even if the table is pivoted in the center of gravity, high dynamic forces must be absorbed in the end positions. The highest forces occur when the turntable is pivoted into the stacking position, because then the table's own weight must likewise be supported. Especially in this stacking position, the turntable/tool half unit tends to vibrate, causing tremendous wear of the components that must absorb these forces.

In terms of the method, in this known apparatus the pivot point is displaced vertically, with a fixed distance between the pivot point and the center of gravity. The magnitude of the fixed distance is a function of the tool; a distance of zero is desirable. In this method, high forces occur in the end positions in the driving components, thereby limiting the number of strokes of the apparatus. The apparatus is costly to produce, and experiences significant wear when a higher stroke number is employed.

DE 197 10 475 A1 discloses an apparatus having a turntable, in which the turntable is moved vertically and pivoted over curved paths. The pin Pos. 4, and thus the pivot point, execute a vertical movement. The turntable suspended in this pivot point has a center of gravity that is spaced from the pivot point by a fixed distance, which does not change during a stroke. The distance can be zero, and is a function of the tool weight. Therefore, in principle, the same problems occur here as in the method according to DE 33 46 628 C2.

High forces occur in the end positions, particularly during tipping, limiting the maximum cycle number of the apparatus. The apparatus has complicated curved paths. The principal problem of guiding a curve roller in a groove is that the direction of rotation of the curve roller is a function of the side of the groove with which it is in contact. Because the contact side alternates, the roller alternatingly rotates in both directions; a change in the direction of rotation causes a high degree of wear to the groove wall and the curved roller, because there is no rolling friction during this time. To avoid this problem, a plurality of curve rollers can be built into each groove (FIG. 2), but this solution is expensive and is associated with rigidity-related problems, because the roller spacing must be changed depending on the curved path. These rollers are therefore resilient, which is, unfortunately, conducive to vibrations of the molding table, because the curve rollers can yield corresponding to the forces.

It is known from CA 2 240 428 A1 to move a turntable over three very complicated curved paths and three curve rollers. No definable central pivot point is present in such a spatial displacement of a table; the direction of movement of the center of gravity of the molding table extends in a specific path as a function of the shape of the curved paths. This pivoting method requires a very complicated, costly apparatus with three curved paths that are exactly matched to one another and are disposed on both sides of the turntable. In this redundant system, the risk exists that the curve rollers will jam. The system is also affected by the problem of the changing direction of rotation of the curved paths depending on the contact side, which changes constantly, resulting in wear. High forces act on the drive elements and the curve rollers during the braking of the pivoting movement, primarily in the approach to the stacking position.

SUMMARY OF THE INVENTION

It is the object of the invention to execute the method of pivoting the turntable such that relatively-small gravitational forces occur during the approach to the end positions of the pivoting movement, and a fast pivoting movement can occur, so the apparatus can be operated with a high number of strokes. The method is intended to require only an apparatus with a simple design, without expensive, complicated curved paths. The method is intended to preclude wear-related problems due to the displacement of a curve roller in the groove of a curved path with correspondingly changing directions of rotation.

According to the invention, the above object generally is accomplished by the selection of a stationary pivot point for the turntable, and the altering of the distance of the turntable/ molding-tool half unit during pivoting. The distance is greater in the end positions of the movement, and is at a minimum, or zero, at one-half of the pivoting angle. The reduction in the distance at the beginning of the pivoting movement additionally accelerates the turntable, which increases the rotating speed. Correspondingly, the increase in the distance during the braking phase as the end positions are approached effects an additional reduction in the rotating speed, without the components being forced to absorb associated forces. The braking and accelerating forces to be absorbed by the components are reduced correspondingly, which permits a high stroke number for the apparatus with low wear. It is advantageous if the distance between the center of gravity and the pivoting point changes continuously during pivoting, and a minimum—possibly to the value of zero—is attained at one-half of the pivoting angle.

The apparatus for executing the method is embodied to include a stationary pivot point, to which the turntable is displaced, with the molding-tool half secured to it, during pivoting such that the center of gravity is moved toward or away from the pivot point. With this design, the position of the bearings for the pivot point need not be changed, which reduces the overall masses to be moved.

In a modification of the apparatus, laterally-pivoting supports support the turntable in the closed position for the molding and punching process. This permits a relatively-lightweight design of the turntable, yet a stable construction that resists bending during molding and punching.

The method and the apparatus are described in detail in conjunction with the schematic drawings.

DESCRIPTION OF THE PREFERRED EMBODIMENTS

Figure 1:
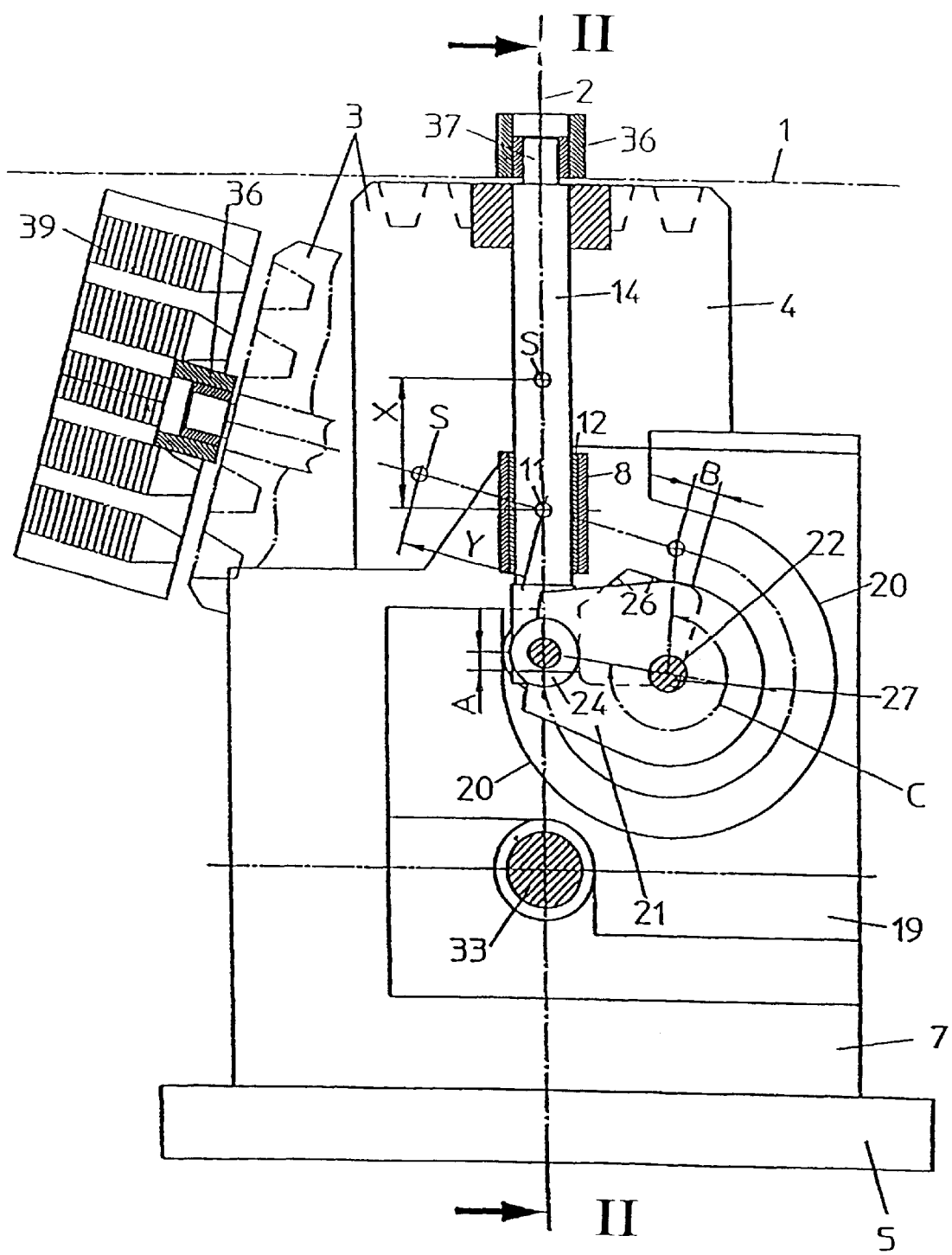
FIG. 1 is a side view of the molding station, partly in section and along the line I—I in FIG. 2.
Figure 6:
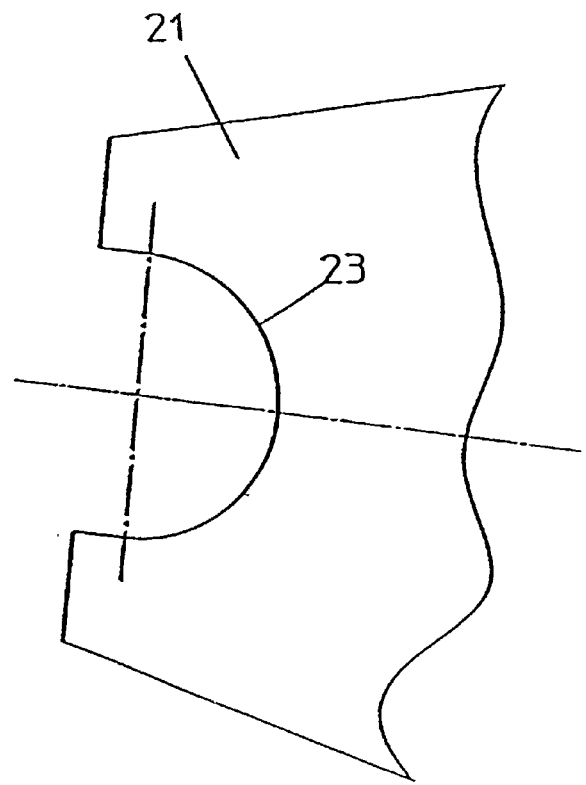
FIG. 6 is an enlarged representation of the lever 21.

The apparatus for executing the method has a transport device, which operates by stroke, for supplying a heated foil strip 1 in sections into the molding station 2, which is embodied as a combination molding/punching station, and in which the strip is deep-drawn into containers by means of differential pressure. In this molding station 2, the containers are separated, and the turntable 4 supporting the lower tool half 3 is pivoted in front of the stack magazines 39, into which the containers are transferred from the deep-draw molding. Other transfer devices, for example, for transferring the containers into a pallet belt, can be provided at this location. For executing the movement of the turntable 4, a guide part 8 is pivotably seated in the respective side faces 6, 7, which are components of the base 5, and are disposed on both sides of the turntable 4; each guide part has a shaft with two pins 9, which slide in a bearing 10. The shaft axis represents the pivot point 11 for the turntable 4. A bore 12 is provided in the guide part 8, at a right angle to the shaft axis; this bore is preferably part of a pressed-in bearing bushing 13 having longitudinal-guidance properties. A rod 14, which is rigidly connected to the turntable 4, slides longitudinally in this bore 12. At its lower end, each rod 14 has a countersinking 15 and a transverse bore 16, so a rotatable roller 18 can be disposed around a pin 17 at this location. This roller 18 is in contact with a guide path 20, which is located in a plate 19 that is immovably secured to the base 5. This guide path 20 is preferably circular, and is thus easy to produce. It gives way to a straight region A and a straight region B at the beginning and end, respectively (FIG. 1). A lever 21, which can be pivoted about the stationary point of rotation 22 by the angle C (FIG. 1), serves to move the roller 18 along the guide path 20. For this purpose, the lever 21 has a recess 23, with which it extends around a roller bearing 24 at the outside ring that is seated on the pin 17, which also supports the roller 18. The recess 23 is semicircular, and changes over to a slot (FIG. 6). This is necessary because the roller bearing 24 is displaced relative to the recess 23 by a small amount, which must be compensated, in the straight regions A, B of the guide path 20. Nevertheless, to assure a defined guidance of the rod end, specifically the roller 18, in these straight regions A, B, a further roller 25 is seated on the pin 17, and impacts a short, straight guide segment 26 that respectively extends in the straight regions A, B and is likewise immovably secured to the base 5.

Figure 2:
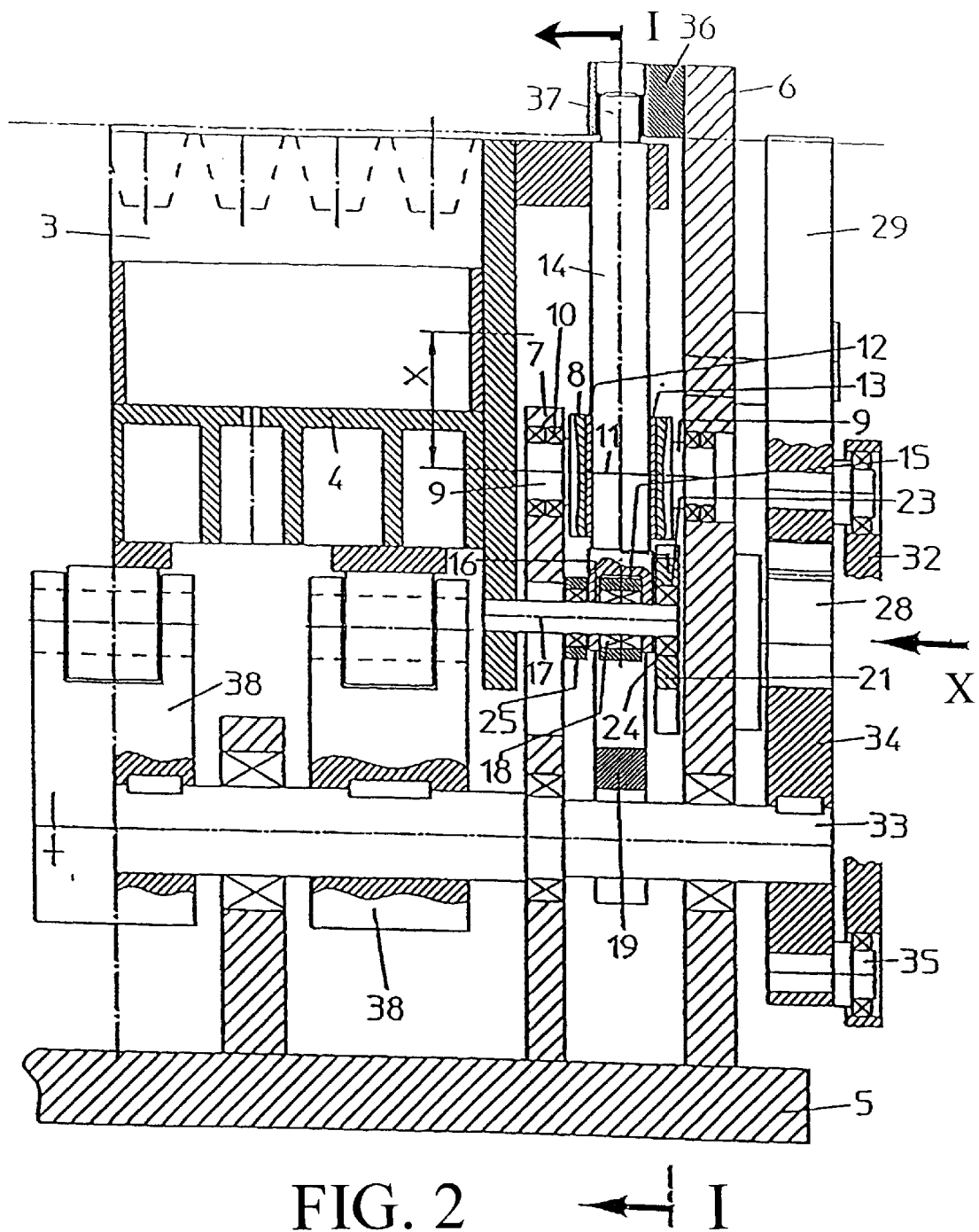
FIG. 2 is a cross-section through the molding station along the line II—II in FIG. 1.
Figure 3:
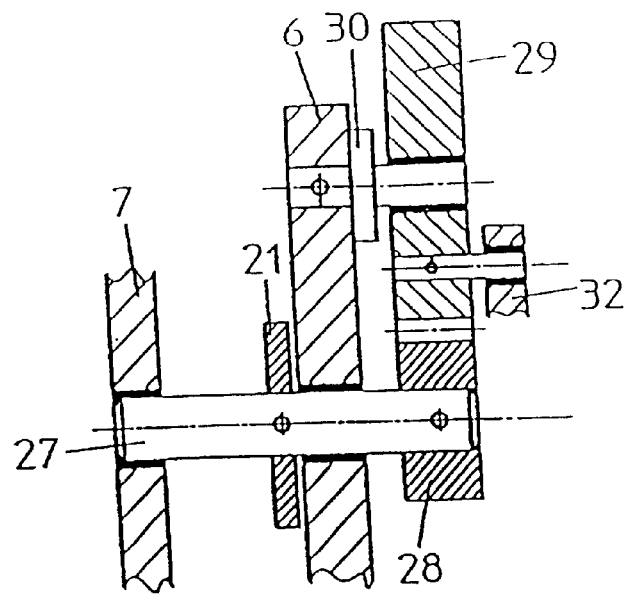
FIG. 3 is a cross-section along the line III—III in FIG. 4.
Figure 4:
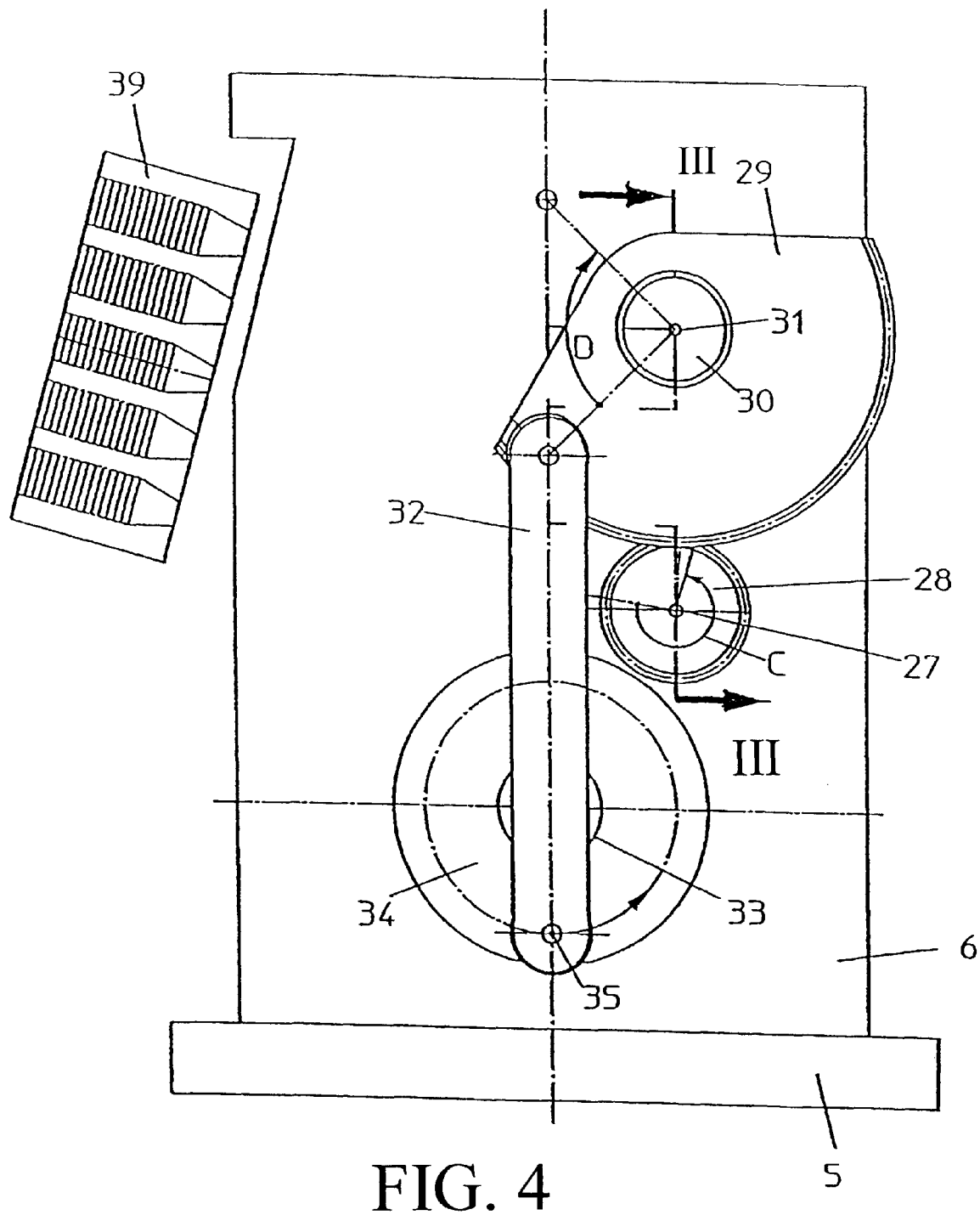
FIG. 4 is a front view of the drive device in the arrow direction X in FIG. 2.

The pivoting movement of the lever 21 can be effected through the synchronization of the movements of the two levers 21 via a synchronizer; the synchronizing shaft is driven directly via a servomotor. FIGS. 2 through 4 illustrate an advantageous embodiment. In this embodiment, the two levers 21 are respectively seated on a pin 27, which is seated in the side faces 6, 7 and supports a gear 28. A toothed segment 29, which is rotatably seated on a pin 30 that is held in the side face 6, meshes with the gear. The toothed segment 29 is pivoted by the angle D via a bracket 32 hinged outside of the point of rotation 31, effecting a rotation of the lever 21. The bracket 32 is displaced from a main shaft 33, on which a disk 34 is secured, with the bracket 32 being hinged eccentrically to the disk by way of the pin 35.

In accordance with a modification of the invention, support elements 38, which are embodied to support the turntable 4 at one or more points when the table 4 is at the high pivoted position, i.e., in the molding/punching position, are seated on the main shaft 33 seated in the base 5, namely in the side faces 6, 7. This modification permits the absorption of high molding and punching forces caused by the supply of molding air and the lowering of the upper tool part for generating the punching stroke. With this embodiment of the apparatus, it is possible to attain the alternating direction of movement of the turntable 4 and an optimum support of the turntable 4 using a single drive, which acts on the main shafts 33 in one direction of rotation—preferably by way of a servo drive.

It has proven advantageous to additionally guide the rods 14 during their linear displacement in the regions A and/or B to assure an exact position of the turntable 4 in the end positions without the risk of vibrations. For this purpose, bearings 36, into which the rods 14 extend with their shoulder 37, are disposed on the base 5 or the side faces 6.

Figure 5:
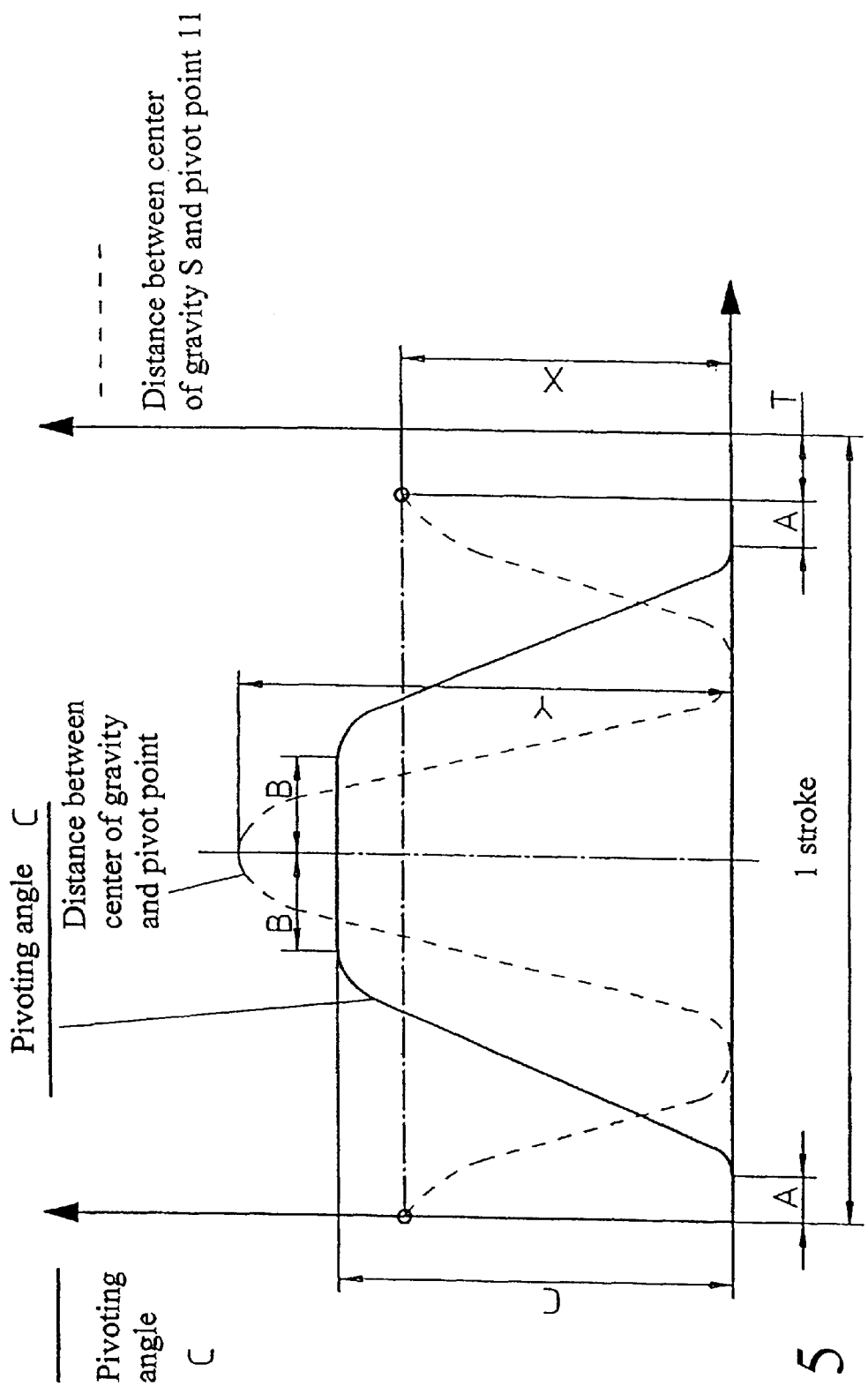
FIG. 5 is a diagram of the course of movement of a stroke.

FIG. 5 in particular provides a detailed description of the function of the apparatus and the relationships between the pivoting angle C of the turntable 4 and the distance between the center of gravity S and the pivot point 11. It is assumed that a batch of containers has been molded and punched out, and the turntable 4 is being guided from the closed position into the stacking position. While traversing the straight region of the guide path 20, the turntable 4 performs a purely-vertical downward movement. It may be additionally guided by the shoulder 37 sliding in the bearing eye 36. The distance between the center of gravity S and the pivot point 11 is reduced, starting from a maximum X, to a minimum at one-half of the pivoting angle C; this distance can be larger than or equal to zero. During the second half of the pivoting angle C, the distance increases to a value Y, with the turntable 4 being fully pivoted and displaced in a straight line over a linear region B, possibly with guidance. It is advantageous to select this value Y to be greater than the value X, because the braking effect brought about by the increase in this distance should be greater during pivoting into the stacking position than in the approach to the closed position, as dictated by the weight of the turntable 4, which has a downward effect.

After the containers have been ejected, the second half of the work stroke is effected in the reverse sequence of the movements until the closed position is attained. This means that the distance between the center of gravity S to the pivot point 11 is initially reduced, and increases again to the value X in the closed position. In this closed position, the drive of the main shaft 33 stops for a predetermined time T, during which the containers are molded through differential pressure, cooled and punched out through a stroke movement of the upper tool part.

As can be see from the diagram in FIG. 5, the distance between the center of gravity S and the pivot point 11 changes continuously until the rest period T, during which no change occurs. This effects a smooth movement of the apparatus, and permits a simple, circular embodiment of the guide path 20.

What is claimed is:

1. An apparatus for molding and punching out containers from a thermoplastic plastic foil, having a molding station and a molding tool, with one molding-tool half being disposed on a turntable, and wherein:
   a) a first end of a respective rod (14) is secured to each side of the turntable (4);
   b) the two rods (14) axially slide in a guide part (8) that is mounted on a stationary support to be pivoted about a pivot point (11) together with the rods and the turn to;
   c) each rod (14) supports a respective first roller (18) on a pin at its end remote from the first end;
   d) each first roller (18) is in contact with a stationary guide path (20); and
   e) a lever (21) engages each rod (14) for guiding the first roller (18) along the guide path (20).

2. An apparatus according to claim 1 wherein: the turntable (3) is mounted in the stationary support for pivotal movement between a closed end position for molding and punching out and a stacking end position for ejecting the containers; the center of gravity of a unit comprising the turntable (4) and the molding-tool half (3) lies, in the end positions, outside of the pivot point (11) about which this unit is pivoted; and the pivot point is located such that, while the turntable (4) is pivoted by a pivoting angle (C) from an end position, the distance between the center of gravity (S) and the pivot point (11) is initially reduced, and increases again after one-half of the pivoting angle (C).

3. The apparatus according to claim 2 wherein the pivot point is located such that the distance between the center of gravity (S) and the central pivot point (11) changes continuously during the movement of the turntable (4).

4. The apparatus according to claim 3 wherein the minimum distance between the center of gravity (S) and the pivot point (11) is attained at one-half of the pivoting angle (C).

5. The apparatus according to claim 4 wherein the distance between the center of gravity (S) and the pivot point (11) reaches the value zero.

6. The apparatus according to claim 2 wherein the distance (X, Y) between the center of gravity (S) and the pivot point (11) is identical in the closed end position of the turntable (4) and in the stacking end position.

7. The apparatus according to claim 2 wherein the distance (X, Y) between the center of gravity (S) and the pivot point (11) is different in the closed end position of the turntable (4) and in the stacking end position.

8. The apparatus according to claim 2 wherein the distance (Y) between the center of gravity (S) and the pivot point (11) in the stacking end position of the turntable (4) is larger than the distance (X) in the closed end position.

9. The apparatus according to claim 1, wherein the guide path (20) is circular, and the point of rotation (22) of the lever (21) is disposed in the center point of the circular guide path (20).

10. The apparatus according to claim 1, wherein the guide path (20) has a straight region (A, B) at one or both of its end regions.

11. The apparatus according to claim 10, wherein a stationary guide segment (26) for guiding each rod (14) as the straight region (A, B) is traversed is provided on the stationary support.

12. The apparatus according to claim 11, wherein a respective second roller (25) guides the rods (14) in the straight region (A, B), and the second roller is seated on the same pin (17) as the respective first roller (18) guided on the guide path (20).

13. The apparatus according to claim 1, wherein the respective levers (21) are pivoted by a coupling connecting the levers with a driven main shaft (33).

14. The apparatus according to claim 13, wherein the coupling includes a disk (34) supported on the main shaft and on which a bracket (32) is disposed eccentrically, the bracket being connected to a toothed segment (29) pivotally mounted on the stationary support, with the toothed segment (29) driving a gear (28) that is secured to a further pin (27)supporting the lever (21).

15. The apparatus according to claim 13, wherein support elements (38) are disposed on the main shaft (33), and are configured to support the turntable (4), which is moved into the closed position, at one or more points.

* * * * *